United States Patent [19]
Gilmore

[11] 3,908,491
[45] Sept. 30, 1975

[54] FLANGE FACING AND CUTTING TOOL
[75] Inventor: Guy T. Gilmore, Houston, Tex.
[73] Assignee: Multi-Fab, Inc., Houston, Tex.
[22] Filed: Mar. 22, 1974
[21] Appl. No.: 453,947

[52] U.S. Cl................................................. 82/4 C
[51] Int. Cl.².......................................... B23B 3/22
[58] Field of Search................................. 82/4, 4 C

[56] References Cited
UNITED STATES PATENTS

| | | | |
|---|---|---|---|
| 145,103 | 12/1873 | Henderson et al. | 82/4 C |
| 2,436,152 | 2/1948 | Richards | 82/4 C X |
| 2,769,234 | 11/1956 | Young | 82/4 C X |
| 3,088,352 | 5/1963 | Tanner | 82/4 C X |
| 3,202,190 | 8/1965 | Gill | 82/4 C |
| 3,630,109 | 2/1970 | MacMikhart | 82/4 C |
| 3,650,514 | 3/1972 | Stunkard | 82/4 C |
| 3,762,246 | 10/1973 | Becker | 82/4 C |

*Primary Examiner*—Harrison L. Hinson
*Attorney, Agent, or Firm*—Ranseler O. Wyatt

[57] ABSTRACT

A multi-purpose tool for flange facing, grooving, or facing cylindrical material or resufacing tubular or cylindrical material, having an air motor and a gear assembly rotated thereby, which assembly, in turn, rotates a rotatable housing on which a work holder assembly is mounted having selective means for feeding the workholder to the work and having means for maintaining said tool in position on the work and being adaptable to various facing and cutting operations.

6 Claims, 5 Drawing Figures

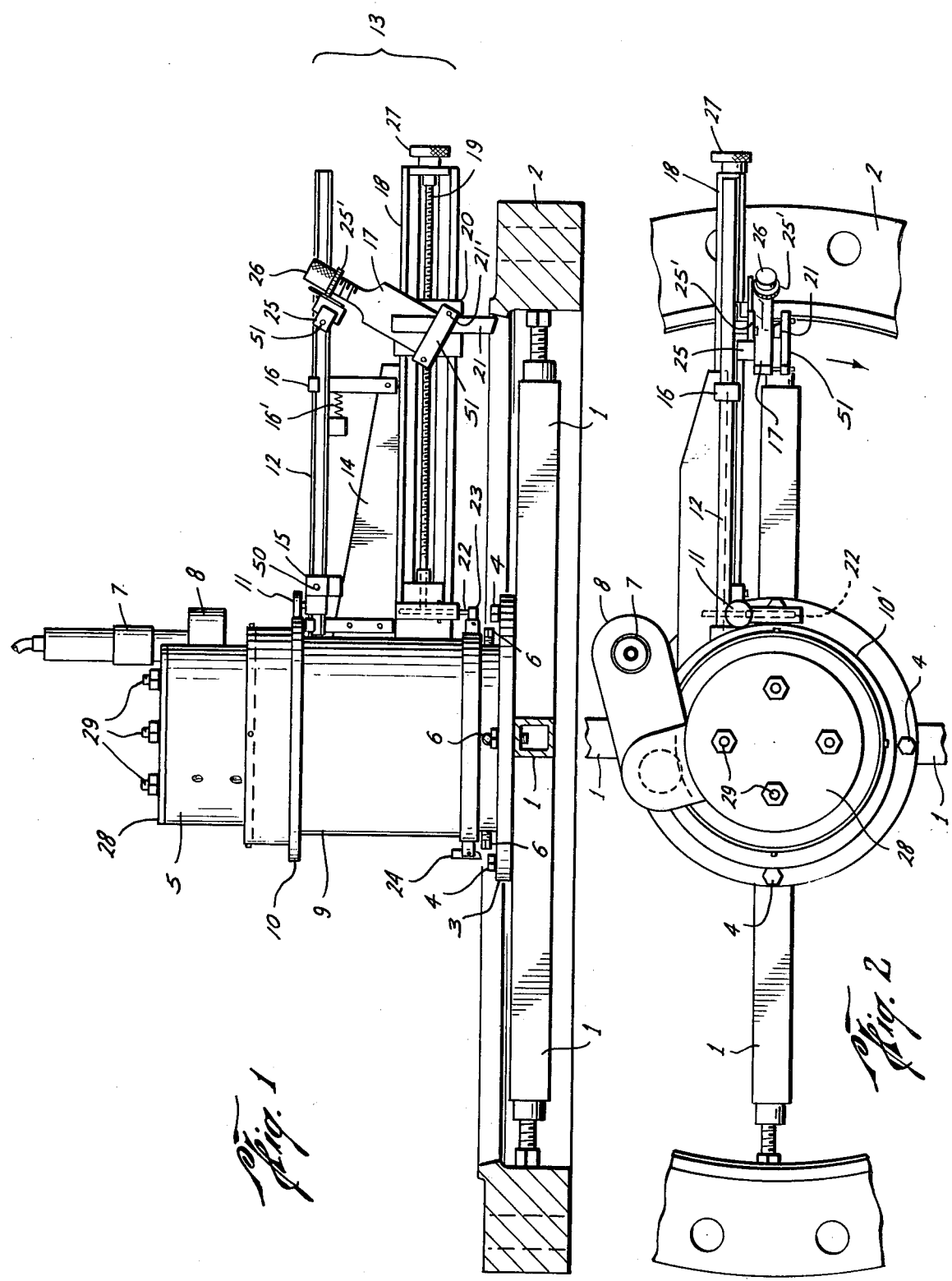

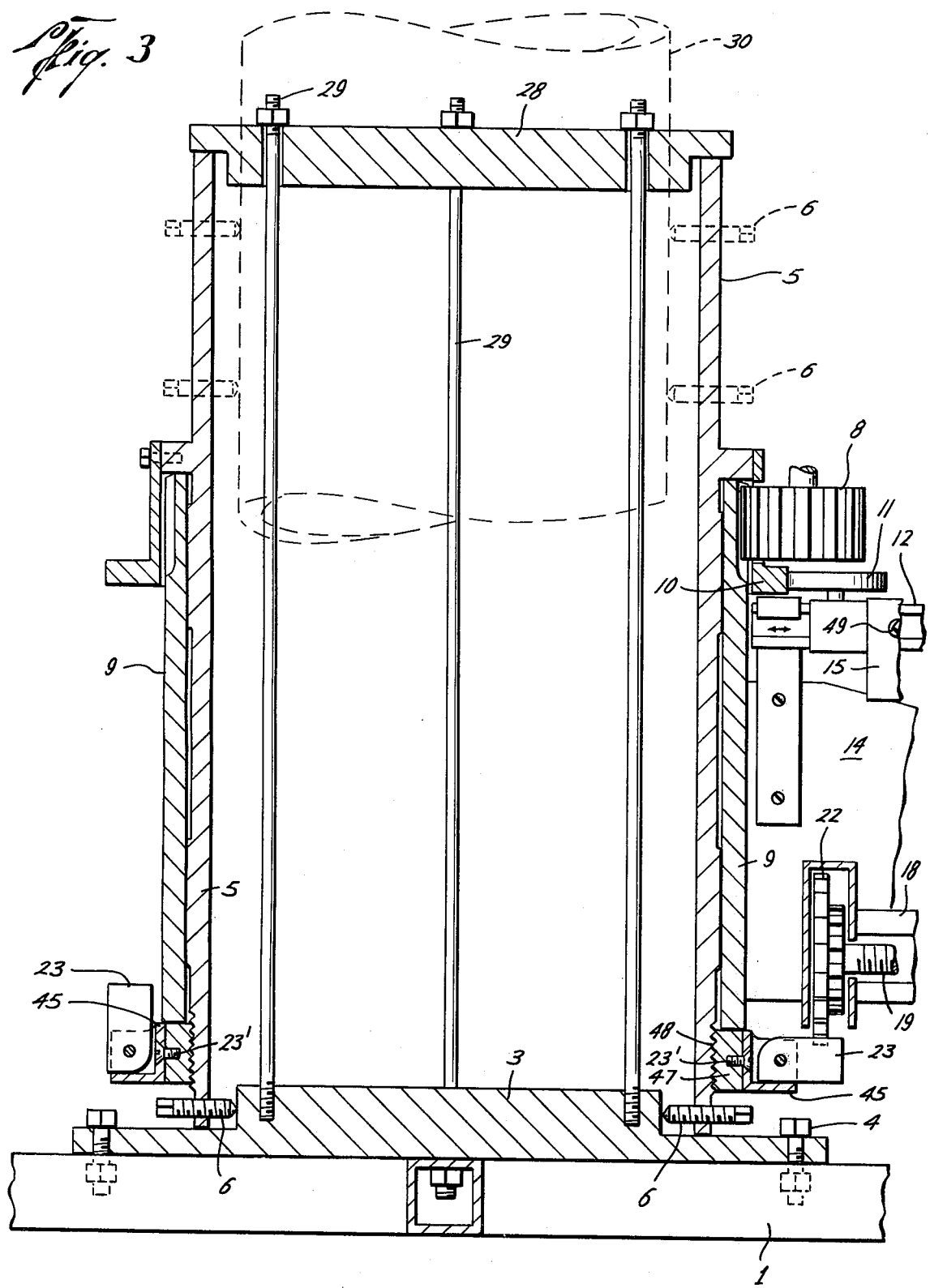

FLANGE FACING AND CUTTING TOOL

BACKGROUND OF THE INVENTION

Refacing tools are common in the industry, and such work presents no great problem when the work is brought to the machine shop. Another question is encountered when the work is brought to the field and the work needs to be done where the equipment is located and the ability to cut, groove, reface or resurface on the location of the equipment is highly desireable and advantageous. In the shop, where refacing of large flanges is to be accomplished, the machinery required is cumbersome and costly, and the handling of such flanges difficult and time consuming. The search in the industry has been for self supporting tools applicable to the work at the location, or in the field, where installed, particularly the resurfacing of journals or bearings where resurfacing of a length of cylindrical material is required.

SUMMARY OF THE INVENTION

A flange facing and cutting tool adaptable to a wide variety of work, having a stationary housing and a rotatable housing mounted on said stationary housing and on which a work holder assembly is mounted, said assembly having selective feeding apparatus for feeding the work holder into the work as the rotating housing rotates and having means for maintaining the tool in the desired position on the work to accomplish a cut at the desired bevel, or for resurfacing a shaft or a tube, or the like.

BRIEF DESCRIPTION OF THE DRAWINGS

FIG. 1 is a side elevational view of the tool mounted on a flange to be faced.

FIG. 2 is a top plan view of the view shown in FIG. 1, showing the flange 10' as eccentric.

FIG. 3 is an enlarged, partial view of FIG. 1 shown in cross section.

BRIEF DESCRIPTION OF THE PREFERRED EMBODIMENT

Figure 4:
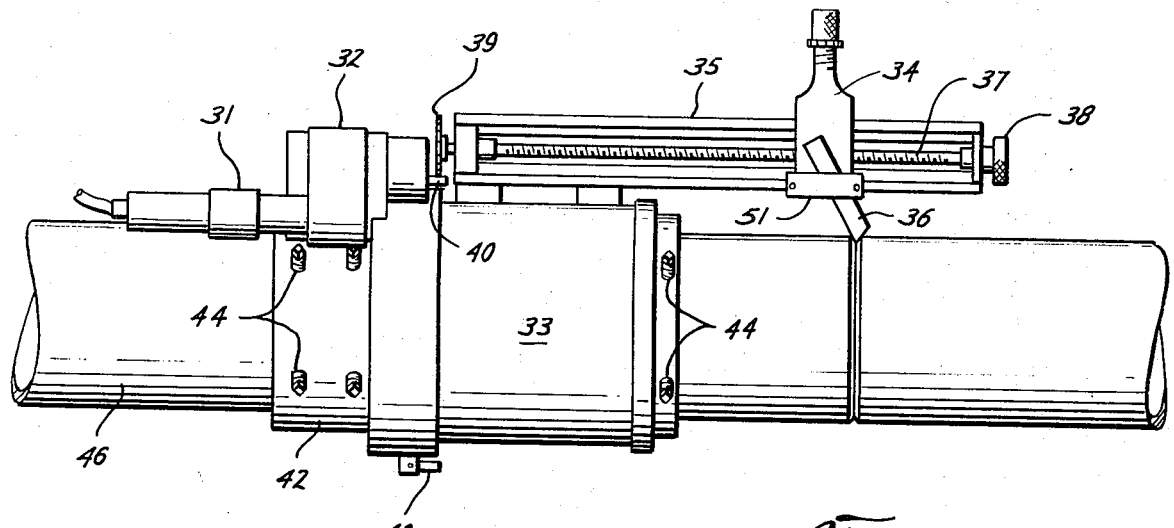
FIG. 4 is a side elevational view of a modified form of the device, as applied to mounting on a cylindrical member.

In the drawings, the numeral 1 designates a spider adapted to be mounted in the inside face of an annular flange or the like, as 2, and mounted on the spider 1 is the base 3, which is anchored to the spider 1 by means of bolts as 4, and on which the stationary housing 5 is secured as by studs 6, 6 and the studs 30, 30 which extend through the cap 28 and into the base member 3.

The air motor 7 connects into the gear box 8, which houses a gear assembly which rotates the rotating housing 9. A flange 10 on the rotating housing 9 provides a track for the bearing 11 on the upper arm 12 of the work holder assembly 13. An outwardly and downwardly tapered guide 14 is mounted on the rotating housing 9 and supports 15, 16 are anchored to the guide 14 and the arm 12 is slidably mounted on the upper ends of said supports. Said supports 15, 16 have suitable means, such as T-head allen bolts 50 to anchor the arm 12 against reciprocation, if desired. A connector 25 is selectively anchored to the arm 12 at the desired position, and has a ratchet in connection with the gear 25' on the cutting tool holder 17. The degree of turn imparted to the gear by the ratchet is determined by the position of the connector 25 on the arm 12, which may be locked in place by the bolt 51. The arm 12 reciprocates longitudinally, the spring 16' constantly urging same in one direction, and is longitudinally slotted to permit the connector 25, to be adjusted longitudinally thereon. The upper end of the cutting tool holder 17 has a ratchet gear connection with the connector 25, and its lower end is mounted on the block 20 and is movable vertically thereon and the block 20 is slidably mounted on the lower arm 18 and a threaded shaft 19 is mounted in the slotted lower arm 18, and extends through a threaded port (not shown) in the block 20 and is movable longitudinally of said arm 18 by rotation of said shaft. The cutting tool holder 17 and the cutting tool 21 are adjustable, the knob 26 providing means for manually adjusting the holder 17 vertically, and the allen bolts 21' mounted in the bar 51 extending into the holder 17, anchoring the cutter in place at the desired position.

A star gear 22, fixedly mounted on the end of the shaft 19 adjacent the housing 9, is selectively activated by the triggers as 23, 24 which are mounted on the stationary housing 5, on an annular ring 47 which is internally threaded and mounts on the housing 5 by means of the external threads 48 thereon, and the set screws 23' anchor the trigger holders 45 on to the ring and the triggers, as 23, 24 are pivoted to the holders 45, so that they may be moved into and out of engaging position.

When a longitudinal cut is being made, as in resurfacing a cylindrical member, the arm 12 is moved out of contact with the wheel 11 and locked in such position by means of the allen bolts and T heads as 49 and a trigger or both triggers, as 23, 24 are moved into engaging position, and will rotate the shaft 19 as the gear 22 reaches the point of contact with the trigger or triggers as the housing 9 rotates.

The cutting tool holder 17, with the cutting tool 21 mounted therein, is maintained in operative position relative to the arm 12 by means of the connector 25, and the angle of the cut is determined by the position of the work holder on the block 20. As the housing rotates, the arm 12 will move back and forth as the housing 9 moves around the flange, or eccentric cam 10, and the wheel 11 follows the contour of the flange 10, and the ratchet in the connector will contact the gear 25' and move the work holder progressively downwardly into the work. Upon each outward stroke of the arm 12, dependent upon the location of the connector on the arm 12, the gear 25', which is integral with the knob 26, will be rotated on the workholder 17, advancing the workholder into the work. When operating the machine in this manner, the triggers 23, 24 are moved into inactive position, out of contact with the star gear.

The bevel of the cut is determined by the position of the holder 17 on the block 20. The screw member 27 allows manual adjustment of the position of the member 20, on the shaft 19.

Where longitudinal cuts are being made, as in resurfacing a tubular or cylindrical member, the movement of the arm 12 is prevented by locking same in position out of contact with the flange 10, and the triggers 23, 24 are moved selectively into active position, to contact the star gear 22, and the control 27 is manually rotated to the desired position for commencing the cut. Where a vertical cut is desired, the triggers may be disconnected, as the trigger 24 is shown, and the cutting tool holder may be hand fed into the work by means of the knob 26.

The top of the housing 5, as 28, is annular and is anchored to the base member by means of the longitudinal studs 29, 29, so that, if desired, the top may be removed and the tool may be mounted on the extended end of a tubular or cylindrical member, such as the pipe 30.

Figure 5:
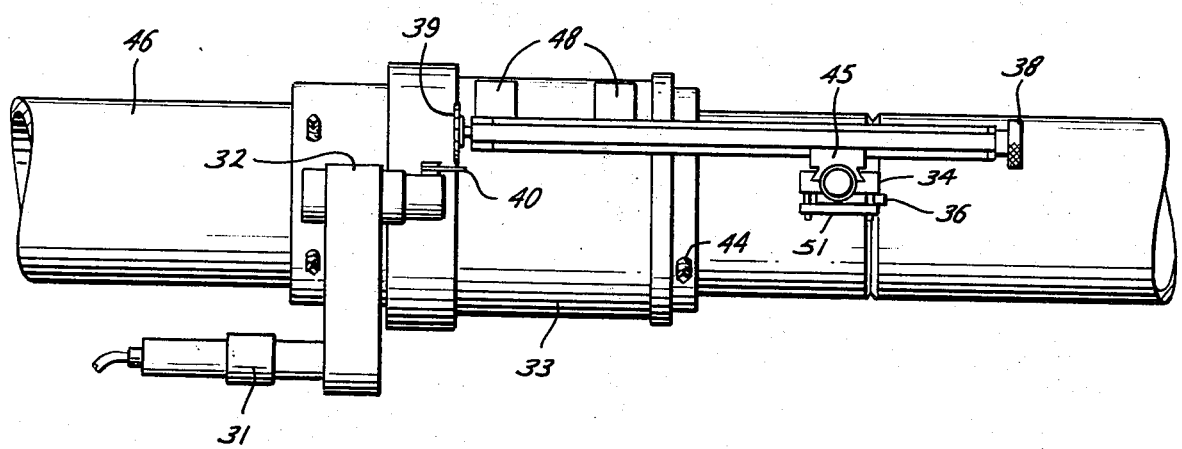
FIG. 5 is a top view of the view shown in FIG. 4.

FIGS. 4 and 5 illustrate use of the unit in resurfacing a journal or bearing. The cap 28 is removed and the member to be resurfaced, as 46, receives the housings 42, 33, and the set screws 44 anchor the stationary housing 42 in place. The arm 12 and support 14 are removed, and the arm 35 is mounted on the housing 33 by means of the straps 48, and will be parallel to the housing, and will extend outwardly from the housing. The air motor 31 operates the gear assembly in the gear box 32, rotating the housing 33, and the workholder 34 is mounted on the slotted arm 35 and the cutting tool 36 is adjustably mounted in the holder 34. The threaded shaft 37 may be manually rotated by the knob 38 to manually adjust the work holder, if desired. The star gear 39, actuated by the trigger 40, rotates the shaft 37 to feed the cutter into the work as the housing 33 rotates. The workholder 34 is longitudinally adjustable on the support 45 and the support 45 is slidably mounted on the arm 35. Where a vertical cut is to be made, the bevel of the cut is determined by the adjustment of the cutting tool in the holder 34 and the workholder is manually fed into the work. Where a longitudinal cut, such as for resurfacing a shaft, is to be made, the workholder 34 is moved to the place of beginning by manually rotating the member 38, and the cutting tool adjusted for the desired depth of cut, and the triggers 30 are selectively moved into active position to contact the star gear 39 to determine the speed at which the work holder is fed to the work.

The operations defined in describing all of the illustrations may be accomplished by a single tool, the only modification necessary being the removal of the workholder assembly and remounting the lowermost arm longitudinally of the rotating housing. The tool may be mounted inside a tube, by means of the spider 1, or may be mounted on a tubular or cylindrical member by removing the top.

What I claim is:

1. In a flange facing device, a rotating housing and a stationary housing, and a base member upon which said housings are mounted, means for supporting said base member on the work, an air motor and a gear assembly for rotation of said rotatable housing, a tool holding assembly on said rotatable housing, a support member in said assembly having an upper arm and a lower arm, said upper arm reciprocably mounted on said rotatable housing and means on said stationary housing for reciprocating said upper arm, and a toolholder adjustably mounted on said arms, means operable by the reciprocating movement of said upper arm for feeding the tool in said tool holder into the work as the rotatable housing rotates.

2. The device defined in claim 1 wherein said toolholder is adjustable on said lower arm to determine the bevel of the cut made with the tool in the toolholder.

3. The device defined in claim 1 wherein said upper arm is reciprocated by an eccentric cam on said stationary housing, a roller on said upper arm bearing against said cam and means on said support urging said upper arm constantly against said cam, a connector on said upper arm and a ratchet in said connector for progressive feeding of said tool to the work as the upper arm reciprocates.

4. The device defined in claim 1 wherein the said toolholder assembly has an outwardly extending lower arm parallel with the said upper arm, and in which a threaded shaft is mounted, a block in the lower end of the toolholder engaged with the threads of said threaded shaft and movable by the rotation thereof, and a star gear fixedly mounted on one end of said shaft, triggers on said stationary housing movable into and out of position to selectively engage said star gear as said rotating housing rotates.

5. The device defined in claim 4 having means on the other end of said shaft for manually rotating same to adjust the position of the toolholder.

6. The device defined by claim 1 wherein said stationary housing is tubular, and is mounted on said base by longitudinal studs, the area adjacent the extended ends of said studs being externally threaded, an annular cap on said stationary housing through which said longitudinal studs extend, nuts on the upper ends of said studs for maintaining said cap on said stationary housing and a spider on the lower end of said stationary housing engageable with the inside surface of a tubular member.

* * * * *